(12) United States Patent
Athmer et al.

(10) Patent No.: US 9,840,131 B2
(45) Date of Patent: Dec. 12, 2017

(54) DEVICE AND SYSTEM FOR PROVIDING A WIND CURTAIN FOR PREVENTING BUGS FROM CONTACTING A VIEWING SURFACE

(71) Applicant: Wind Surface Pro, LLC, West Palm Beach, FL (US)

(72) Inventors: Michael Athmer, West Palm Beach, FL (US); Jerry Albano, West Palm Beach, FL (US)

(73) Assignee: Wind Surface Pro, LLC, West Palm Beach, FL (US)

( * ) Notice: Subject to any disclaimer, the term of this patent is extended or adjusted under 35 U.S.C. 154(b) by 78 days.

(21) Appl. No.: 14/742,005

(22) Filed: Jun. 17, 2015

(65) Prior Publication Data

US 2016/0368350 A1   Dec. 22, 2016

(51) Int. Cl.
*B60J 1/20* (2006.01)
*A01M 29/00* (2011.01)
*B60S 1/54* (2006.01)

(52) U.S. Cl.
CPC ............ *B60J 1/2094* (2013.01); *A01M 29/00* (2013.01); *B60J 1/2002* (2013.01); *B60S 1/54* (2013.01)

(58) Field of Classification Search
CPC ....... B60J 1/2094; B60J 1/2002; B60J 1/2005
USPC ................... 296/91, 180.1; 454/123
See application file for complete search history.

(56) References Cited

U.S. PATENT DOCUMENTS

| | | | |
|---|---|---|---|
| 2,184,798 A | 12/1939 | Gracey | |
| 2,816,796 A * | 12/1957 | Saucerman | B60J 1/2005 296/91 |
| 3,015,517 A | 1/1962 | Thornburgh | |
| 3,214,215 A * | 10/1965 | Hansen | B60J 1/2005 296/91 |
| 3,647,256 A | 3/1972 | Cox | |
| 3,815,700 A | 6/1974 | Mittendorf | |
| 3,817,572 A * | 6/1974 | Francis | B60J 1/2005 296/91 |
| 4,320,920 A * | 3/1982 | Goudey | B62D 35/001 296/91 |
| 4,621,860 A | 11/1986 | Gerst | |
| 5,082,321 A | 1/1992 | Brewer | |
| 5,630,640 A | 5/1997 | Fior | |
| 6,224,135 B1 | 5/2001 | Rehkopf | |
| 7,232,175 B2 | 6/2007 | Yuan | |

(Continued)

FOREIGN PATENT DOCUMENTS

| | | |
|---|---|---|
| GB | 194183 | 3/1923 |
| LU | 46116 | 1/1972 |

*Primary Examiner* — Jason S Morrow
(74) *Attorney, Agent, or Firm* — McHale & Slavin, P.A.

(57) ABSTRACT

The present invention is directed to a device and system designed to prevent organisms, such as bugs, from contacting a viewing surface, such as a windshield or window associated with a moving vehicle. The device contains at least a first side wall having an air intake member constructed to receive and capture air flow generated by movement of the motor vehicle. A second wall contains air distribution members and is oriented in a different direction as that of the first wall. Because the device is designed to have side walls oriented at different directions, air exiting the device travels in a different path than the path of entry. In this manner, air flow can be directed to travel across a viewing surface, thereby providing a curtain of air thereupon.

12 Claims, 10 Drawing Sheets

(56) References Cited

U.S. PATENT DOCUMENTS

| | | |
|---|---|---|
| 7,344,183 B2 | 3/2008 | Brash |
| 8,651,554 B1 | 2/2014 | Patelczyk et al. |
| 2006/0152031 A1 | 7/2006 | Yuan |
| 2009/0017743 A1* | 1/2009 | Raghuprasad ............ B60S 1/54 454/123 |
| 2015/0225025 A1* | 8/2015 | Habershon ........... B62D 35/001 296/180.1 |

* cited by examiner

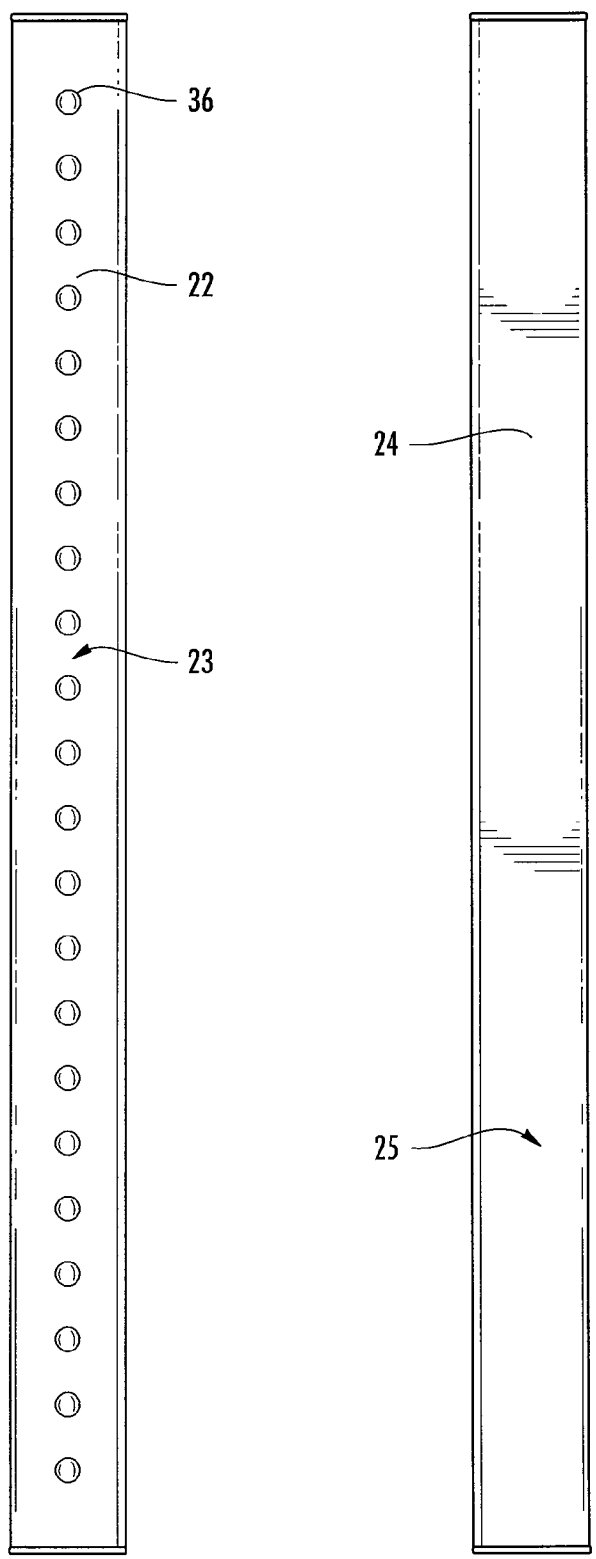

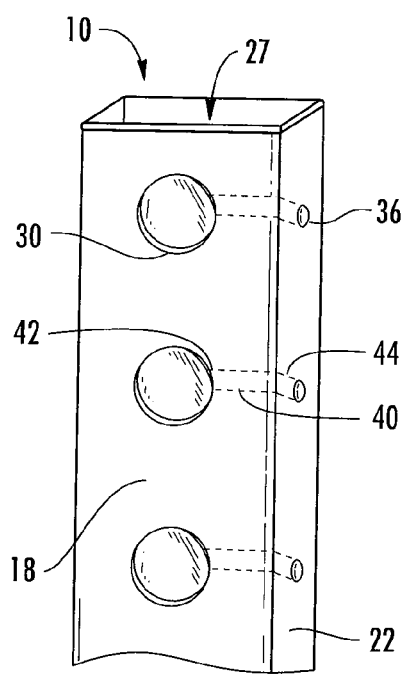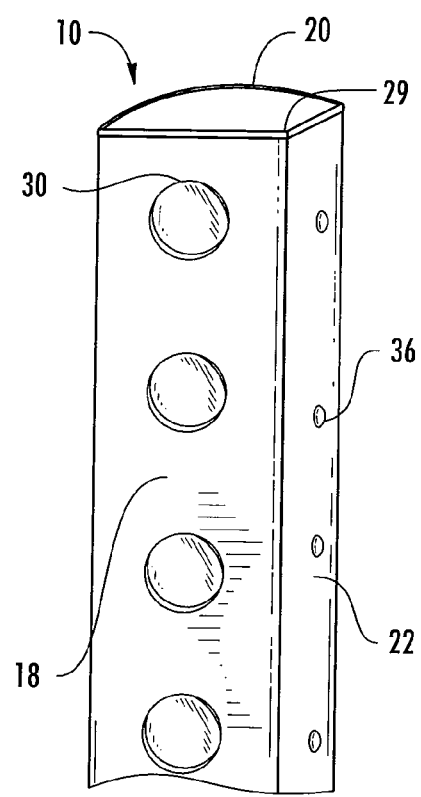
FIG. 8
FIG. 9

DEVICE AND SYSTEM FOR PROVIDING A WIND CURTAIN FOR PREVENTING BUGS FROM CONTACTING A VIEWING SURFACE

FIELD OF THE INVENTION

The present invention relates to bug shields; and more particularly to a device and system for producing a wind curtain to prevent or minimize bugs from contacting a viewing surface.

BACKGROUND OF THE INVENTION

Whether for personal use or for business purposes, motor vehicles are an integral component of modern, industrialized societies. Whether transporting humans or commercial goods, safely transporting goods or the associated human cargo running the vehicles is of utmost importance. Over the years, motor vehicle companies have designed and put in place many safety features designed to minimize deaths during operation. For example, in the auto industry, car manufacturers install safety bags in order to minimize injury. New cars are being manufactured with smart technology, such as enhanced gesture control to aid the user in controlling the automobile's features, head up display, and even sensors to alert the driver when they sway into another lane. All this technology is designed to aid the user in preventing accidents.

In addition to the high tech safety features aimed at preventing accidents, it is imperative that drivers are able to clearly visualize the external environment while operating their vehicle. A well-known feature that provides safe viewing associated with all automobiles is windshield wipers. While wipers are great at removing water, they are not effective at removing bugs splattered against the windshield. In fact, use of wipers actually decreases visibility.

Devices for deflecting air streams and bug deflectors are known in the art. Most of these devices rely on an external structure attached to the hood of a car. For example, U.S. Pat. Nos. 2,184,798, 3,015,517, 3,647,256, and 3,815,700 each describe such a device.

U.S Pat. No. 5,082,321 is described as a single piece air streamlining deflector shield for a motor vehicle. The device is described as being mounted transversely, behind the leading edge of the hood of the vehicle, and which, because of its shape and construction, is self-supporting transversely over the hood to sub-surface mounting positions on the inner lateral edges of the hood. The device is further described as having a shape and construction that directs a volume of generally oncoming air, incident the front of the vehicle when in a forward motion, to pass unobstructed by the shield or mounting hardware under, as well as over, the leading edge of the shield. The shield is described as deflecting the airflow both over the upper surface and under the lower surface of the shield to combine behind the rearward edge of the shield.

U.S. Pat. No. 5,630,640 is described as concerning a vehicle having a deflecting surface which is attached to the vehicle in front of at least one front area. The deflector surface is described as being concave with a concavity facing forwards, which extends in the transverse direction of the vehicle so as to receive a relative air current when the vehicle is moving. The deflector surface is also described as having an upper trailing edge pointing upwards and at least one wing fixed in the relative air current immediately upstream, facing and adjacent to the deflecting surface. The deflecting surface and the wing are described as extending below the lower horizontal plane, and are adapted to form an air flow deflected upwards which is able to act as an air screen in front of the standard zone in which the eyes are situated in which the air is at least essentially still.

U.S. Pat. No. 6,224,135 is described as an air deflector for a motor vehicle that is adapted to be attached to the posterior portion of a roof structure of a motor vehicle for purposes of directing the flow of air over the roof of a moving motor vehicle downwardly over the rear surface of the motor vehicle. The deflector is described as comprising an air collector member having an internal air passage that is curved downwardly to deflect air movements from a horizontal flow pattern to a substantial vertical flow directed downwardly adjacent to the posterior surface of the vehicle, such device having a concave lower surface adapted to fit conformingly over the rear portion of the roof, with attachment means affixed to such lower surface.

U.S. Pat. No. 7,232,175 is described as a debris deflector to deflect oncoming wind, rocks and bugs by diverting the wind which is associated with rocks, bugs, and other debris. The device is described as diverting the rocks, bugs, and other debris up and away from the vehicle's body. The deflector is described as attaching to the front of a car, truck, sport utility vehicle (SUV), or any other type of vehicle that is prone to oncoming debris, and includes a wing and a pair of pillars connecting the wing to a wind tunnel portion.

U.S. Pat. No. 8,651,554 is described as a vehicle shield constructed to avoid excessive hood flutter. The shield is described as including a vehicle shield region and an attachment region. The vehicle shield region is further described as being constructed for extending across at least a portion of a vehicle hood for protecting the vehicle hood. The attachment region is described as being constructed for attaching the vehicle shield region to a vehicle.

SUMMARY OF THE INVENTION

The present invention is directed to a device and system designed to prevent organisms, such as bugs, from contacting a viewing surface, such as a windshield or window, associated with a moving vehicle. The device is designed to receive and capture air flow generated by movement of the motor vehicle, and redistribute the air outwardly. Because the device is designed to have side walls oriented at different directions, air exiting the device travels in a different path than the path of entry. In this manner, air flow can be directed to travel across a viewing surface, thereby providing a curtain of air thereupon. The curtain of air formed across the viewing surface prevents bugs from striking, contacting, or splattering across the viewing surface.

In one embodiment, the device comprises a main body having a plurality of surfaces, including a first surface configured to be securable to a viewing surface associated with a moving vehicle, a second surface configured to receive airflow generated by movement of said moving vehicle, whereby said received airflow is directed into said interior region, and a third surface adapted to allow airflow out of said interior region and orientated at a different position relative to said second surface, whereby airflow directed out of said third surface travels in a direction that is different than the direction of the air flow entering said second surface. One or more air intake members and one or more air distributing members provide the mechanism for creating a wind curtain from the air generated by the moving vehicle.

In an illustrative embodiment of a system for providing a wind curtain upon a viewing surface associated with a moving vehicle, the system comprises, a first device secured at one end of a viewing surface associated with a moving vehicle, said first device comprising a first wall securable to the viewing surface associated with a moving vehicle; a second wall comprising at least one air intake member adapted to receive airflow generated by motion associated with movement of the moving vehicle; and a third wall comprising at least one air distribution member, the third wall orientated at a different position relative to the second wall; and a second device secured at a second end of the viewing surface associated with the moving vehicle, the second device comprising a second device first side wall securable to said viewing surface associated with a moving vehicle; a second device second wall comprising at least an air intake member adapted to received airflow generated by motion associated with movement of the moving vehicle; and a second device third wall comprising at least one air distribution member, the second device third wall orientated at a different position relative to the second device second wall. Airflow exiting the air distribution member of the first device is directed in a path that is parallel to and towards the center of the viewing surface associated with a moving vehicle. Airflow exiting the air distribution member of the second device is directed in a path that is parallel to and towards the center of the viewing surface associated with a moving vehicle to form a wind curtain thereupon.

Accordingly, it is an objective of the instant invention to teach a device for providing a wind curtain upon a viewing surface.

It is a further objective of the instant invention to teach a system for, providing a wind curtain upon a viewing surface.

It is yet another objective of the instant invention to provide a device for providing a wind curtain upon a viewing surface associated with a moving vehicle.

It is a still further objective of the invention to provide a device adapted to intake an air current traveling in one direction, and redirect the airflow to a second direction.

It is a further objective of the instant invention to provide a device adapted to intake an air current traveling in one direction, and redirect the airflow to a second direction, whereby a wind curtain is formed upon a viewing surface.

It is yet another objective of the instant invention to provide a system adapted to intake an air current traveling in one direction, and redirect the airflow to a second direction.

It is a still further objective of the invention to provide a system adapted to intake an air current traveling in one direction and eject airflow in a second direction, whereby a wind curtain is formed upon a viewing surface.

Other objectives and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

BRIEF DESCRIPTION OF THE FIGURES

FIG. 5 is a side view of the device for providing a wind curtain upon a viewing surface;

FIG. 6 is an alternative side view of the device for providing a wind curtain upon a viewing surface;

FIG. 8 is a perspective view illustrating the device for providing a wind curtain upon a viewing surface utilizing internal passageways;

FIG. 9 is a perspective view illustrating an alternative configuration of the device for providing a wind curtain upon a viewing surface;

DETAILED DESCRIPTION OF THE INVENTION

Figure 1A:
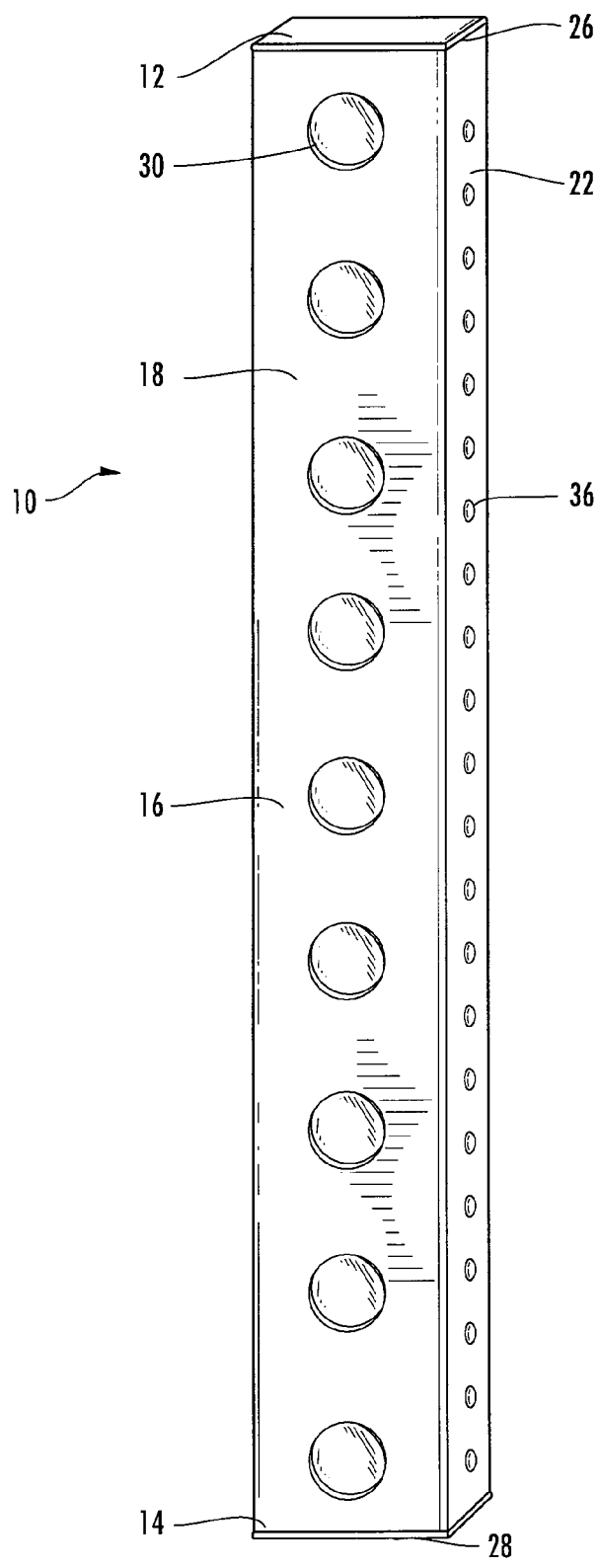
FIG. 1A is a side perspective view of the device for providing a wind curtain upon a viewing surface.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Referring to FIGS. 1A, and 2-6, a device for providing an air or wind curtain upon a viewing surface, referred to generally as device 10, is illustrated. The device 10 comprises a first end 12, a second opposing end 14, and a main body 16 separating the first end 12 and the second opposing end 14. The main body 16 is illustrated having 4 side walls, side wall 18 having a surface 19, side wall 20 having a surface 21, side wall 22 having a surface 23, and a side wall 24 having a surface 25. Side walls 18 and 20 are arranged in a generally parallel orientation relative to each other and are separated by side walls 22 and 24. Side walls 22 and 24 are arranged in a generally parallel manner relative to each other. As illustrated, the side walls are oriented at or near right angles. However, the orientation could be arranged to form acute or obtuse angles. The main body has an enclosed inner area defined by the side walls 18 and 20, 22, and 24. The enclosed inner area 27 (see FIG. 2) may be partially hollow, hollow, or solid.

Depending on the make-up of the interior area, the first end 12 may be sealed to prevent air, water or debris from entering the enclosed inner area 27 or air escaping out through the top. As an illustrative embodiment, the first end 12 in FIG. 1A is shown with a cap 26 permanently or removably attached thereto. The cap 26 may be sealed to the first end 12 using, for example, a chemical fastening mechanism such as glue. The cap 26 can be sealed using mechanical fastening mechanisms, such as through the use of a screw or nails. The cap 26 could be constructed to include male threading designed to interact and secure to female threading within the main body 16. Alternatively, the cap 26 could be designed to provide a frictional fit inside the main body 16. A second cap 28 can be secured to the second end 14 to prevent air, water, or other debris from entering into the enclosed inner area 27 of the main body 16 or air from escaping out through the bottom.

Figure 1B:
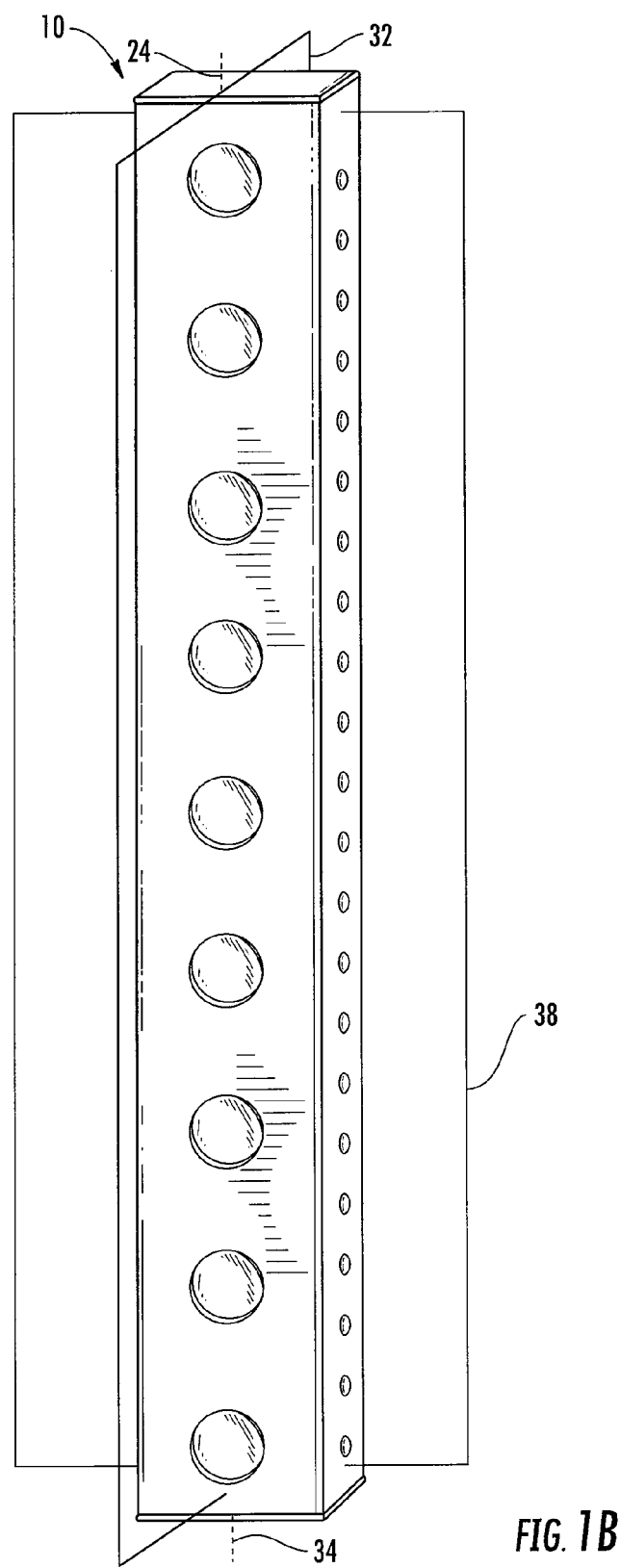
FIG. 1B is an alternative side perspective view of the device for providing a wind curtain upon a viewing surface illustrated in FIG. 1A showing the various planes of airflow into and out of the device.
Figure 2:
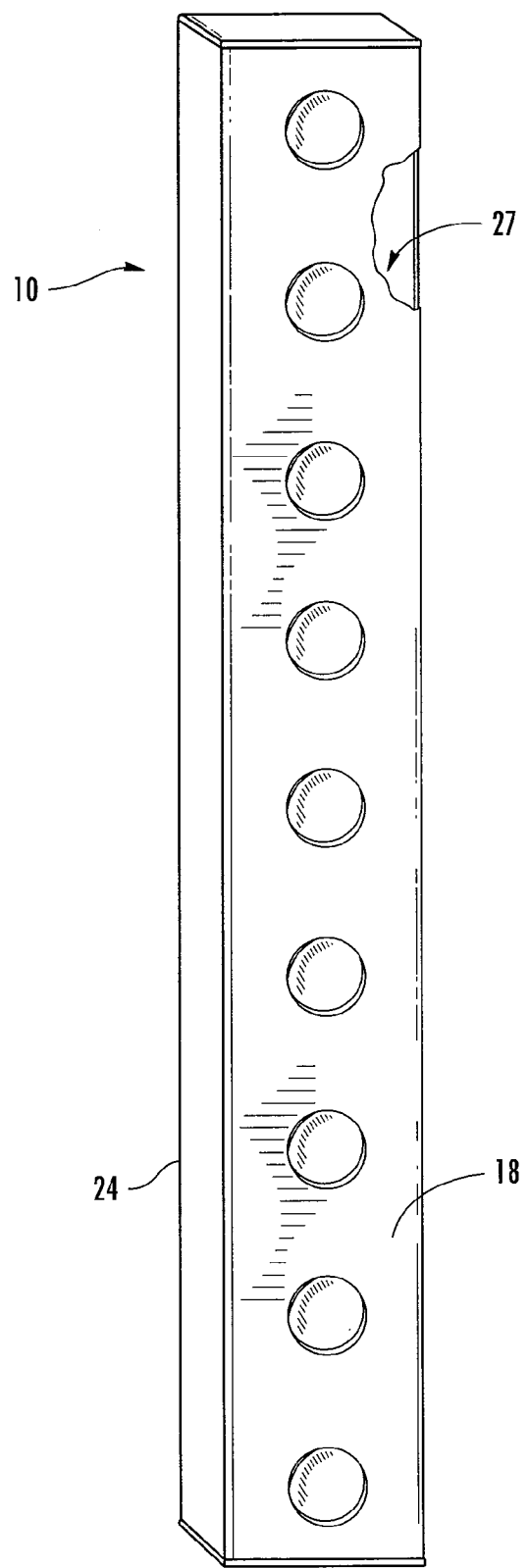
FIG. 2 is an alternative side perspective view of the device for providing a wind curtain upon a viewing surface shown in FIG. 1A or 1B
Figures 3, 4A, 4B:
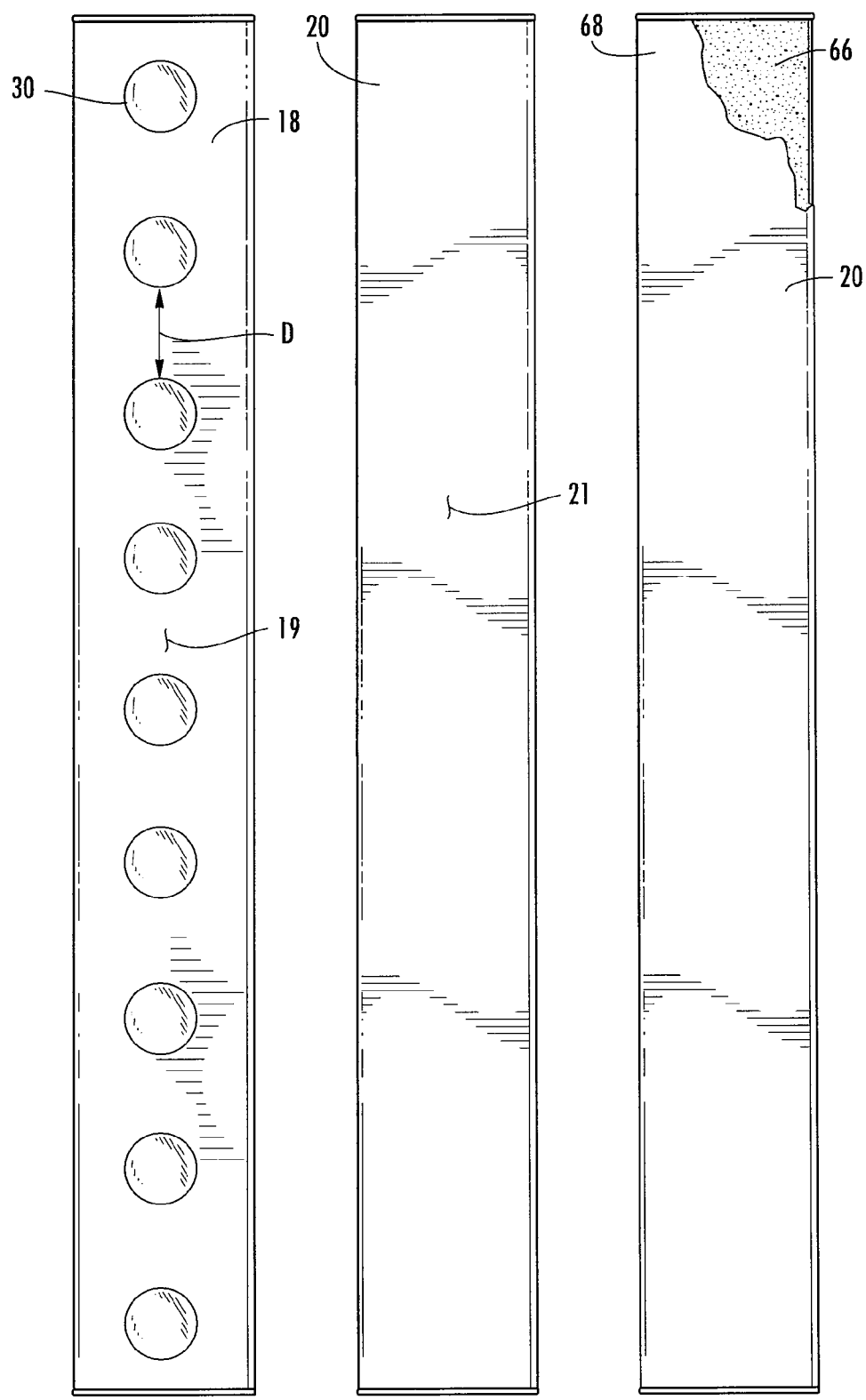
FIG. 3 is a front view of the device for providing a wind curtain upon a viewing surface.
FIG. 4A is a back view of the device for providing a wind curtain upon a viewing surface.
FIG. 4B illustrates a side wall shown having an adhesive material and liner.
Figure 7:
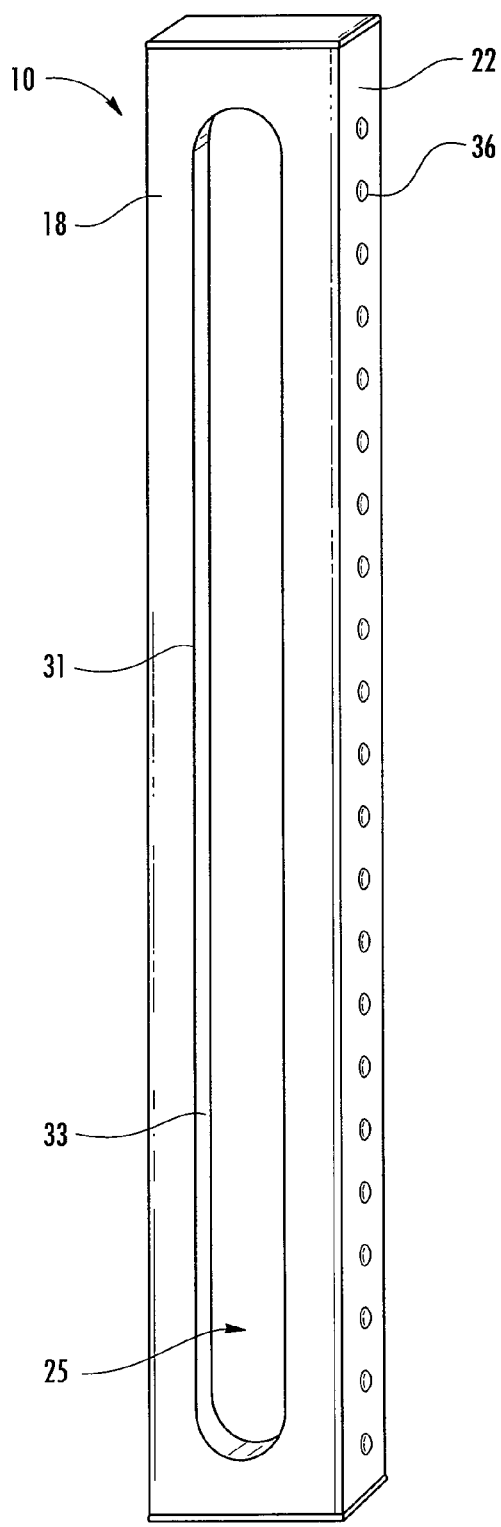
FIG. 7 is a perspective view illustrating the device for providing a wind curtain upon a viewing surface having an alternative air intake member.

The device 10 is designed to receive a stream of air traveling in one direction or path, and redirect the incoming air flow outwardly in another, second direction or path. The direction of airflow traveling in the second direction or path is different from the direction of airflow traveling in the first direction. To achieve this effect, the device 10 utilizes one or more air intake members positioned on or within one of the side walls of device 10. The side wall, side wall 18, is preferably orientated to receive incoming air flow from a first direction. As illustrated in FIGS. 1A-2, the device 10 includes air intake members, illustrated herein as a first plurality of openings 30, arranged on side wall 18. While the device 10 is described utilizing a plurality of openings, other air intake members may be used. While the air intake members are described as circular openings, any structure that captures or receives air generated by the movement of the vehicle and directs that air into the interior of the device 10 can be used. FIG. 7 illustrates the device 10 having an air intake member in the form of an elongated slot 31 running the length of main body. The elongated slot 31 contains an inwardly sloping surface 33 designed to direct air into the enclosed inner area 27.

Referring back to the embodiments shown in FIGS. 1A-6, each opening of the plurality of openings 30 is spaced apart from adjacent openings and is positioned on the main body 16, extending from the first end 12 to the opposing second end 14. The plurality of openings 30 is oriented within the side wall 18 within a direction of a first plane 32. The first plane 32, as well as side wall 18, is generally parallel to the longitudinal axis 34 of the device 10. Positioned on an opposite side wall, side wall 22, are air distribution members, illustrated herein as a second plurality of openings 36. While the air distribution members are shown as circular openings, any structure that allows the air to be directed out from the interior area 27 of the device 10 can be used. The second plurality of openings 36 can also be positioned on or within the main body 16 from the first end 12 to the opposing second end 14. Each second opening 36 can be arranged on the main body 16 to correspond with the positioning of the first opening 30. In addition, one or more second openings 36 can be positioned on or within an area or a space on the side wall 22 corresponding to the area (see D on FIG. 3) between adjacent first openings 30. The one or more second openings 36 are preferably smaller in diameter than the first openings 30. The side wall 32 is orientated at a different direction than the side wall 18. As illustrated, the side wall 18 is oriented in a generally perpendicular position relative to the side wall 22. In this manner, the one or more second openings 36 allow for air flow out of the device 10 along a second direction defined by a second plane 38. The second plane 38 is shown in a generally perpendicular orientation relative to the longitudinal axis 34, as well as to the first plane 32.

The plurality of first openings 30 is oriented within the side wall 18 to receive air flow into the device 10 in the direction of the first plane 32. The first plane 32, as well as side wall 18, is generally parallel to the longitudinal axis 34 of the device 10. While the side walls 18 and 22 are shown having a generally perpendicular orientation, such configuration is not limiting. As such, changing the orientation of the side walls relative to each other, therefore, allows for changing the direction of air flow. The side wall 20, see FIG. 4A, and the side wall 24, see FIG. 2 or 6, are preferably solid, lacking any openings which allow air entering the plurality of openings 30 of the device 10 from escaping.

Referring to FIG. 8, the device 10 is shown having a solid enclosed interior area 27. One or more internal passageway 40 fluidly connects the air intake members, i.e., the first plurality of openings 30, to the air distribution members, i.e. the second plurality of openings 36. The internal passageway 40 may be a carved portion of the solid interior. Alternatively, the internal passageway 40 may be tubing, such as plastic tubing, secured to the first plurality of openings 30 at one end 42 and to the second plurality of openings 32 at the opposite end 44.

While the device 10 is illustrated having a rectangular shape with 4 side walls, other shapes may be used. Referring to FIG. 9, the device 10 is shown having three side walls, 18, 20 and 22. The side wall 20 is shown having a curved surface, whereas side walls 18 and 22 are generally planar. As described previously, the side wall 18 contains a plurality of first openings 30. The side wall 22 contains a plurality of second openings 36. The side walls 18 and 22 may be arranged so that angle 29 that separates them is a right angle, an obtuse angle or an acute angle.

Figure 10:
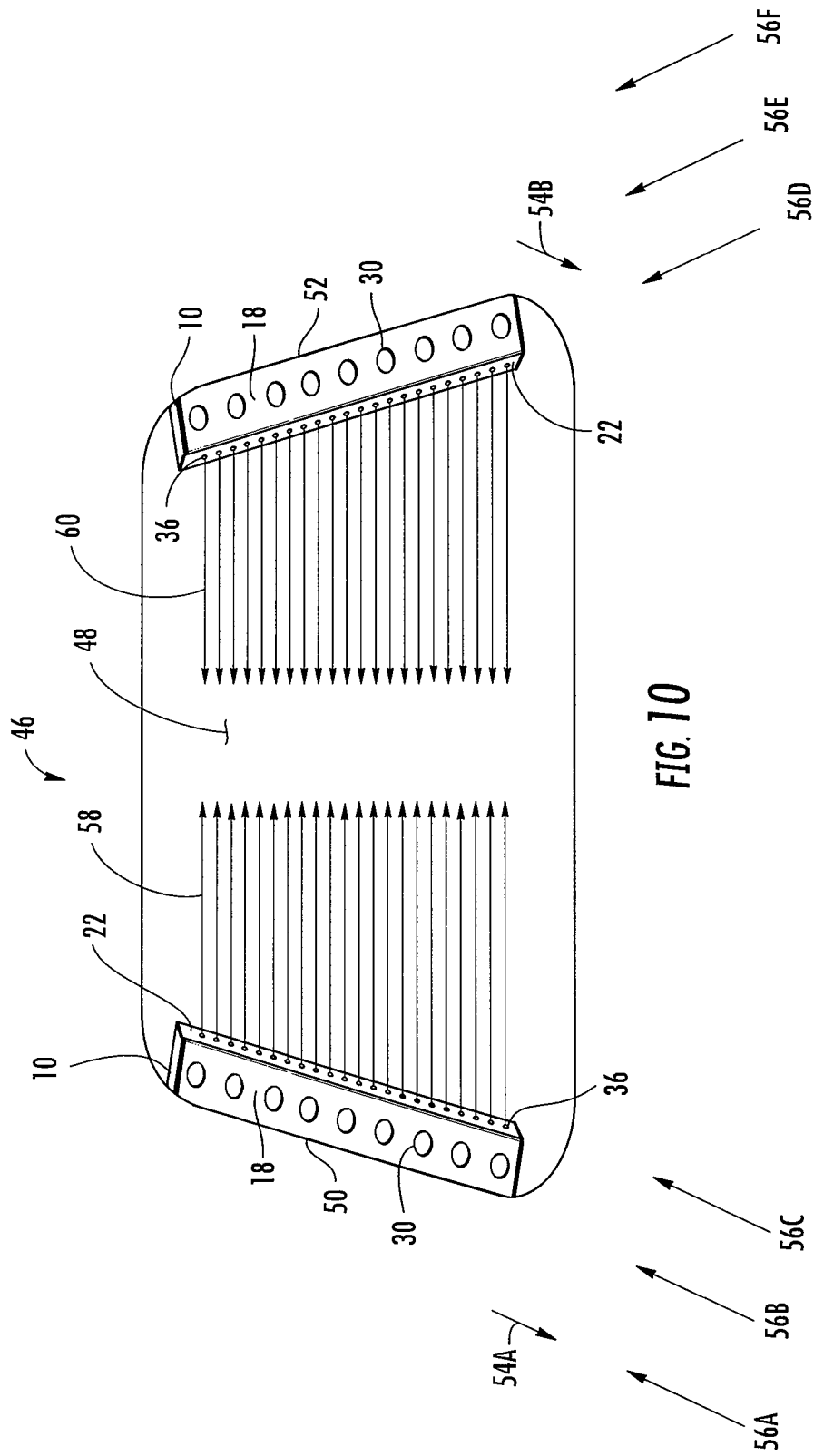
FIG. 10 illustrates the positioning of the device for providing a wind curtain upon a viewing surface on an vehicle windshield.

The present invention is further described through an illustrative application of the device 10 in use as a system utilized with a moving vehicle that contains one or more viewing surfaces. FIG. 9 illustrates the system for providing a wind curtain for preventing organisms, such as bugs, from contacting a viewing surface. The system includes securing device 10 to a viewing surface. As shown in FIG. 10, the viewing surface is a windshield 46 of a motor vehicle, such as an automobile, having a viewing surface 48 in which a driver or other passenger traveling inside of the motor vehicle can view the external environment. Such capability is vital to the safe usage of the automobile. In addition, a clear viewing surface is critical to prevent accidents. The system which utilizes a first device 10 attached or secured to a portion of the windshield 46 at a first end 50 and a second device 10 attached to or secured to the windshield 46 at a second, opposite end 52 of the windshield 46. As the motor vehicle is traveling in the direction indicated by arrows 54A and 54B, an air current is created, traveling in the direction indicated by arrows 56A-56F. The device 10 secured to the first end 50 of windshield 46 receives airflow, such as that indicated by arrows 56A-56C. The airflow is caught by air intake members, which in this illustration is represented by the plurality of openings 30, and transfers the air into the enclosed inner area 27. Alternatively, if the device 10 contains internal passageway 40, the air is directed into each passageway. Air is then directed outwardly, away from the device in a different direction from its original pathway upon entry into the device 10, through the air distribution members, which in this illustration is represented by the second plurality of openings 36. As shown, the air is re-directed towards the center of the windshield 46. As the air is directed out from the device 10, a pressurized airflow is formed and is represented by arrows 58. The airflow is directed in a parallel orientation relative to the windshield 46, thus creating a partial wall of air that prevents bugs from contact as the motor vehicle is moving.

A second device 10 is secured to the second end 52 of the windshield 46. The second device 10 is positioned on the windshield so that it receives airflow, such as that indicated by arrows 56D-56F. The airflow is caught by air intake members, which in this illustration is represented by the plurality of openings 30, and transfers the air into the enclosed inner area 27. Alternatively, if the second device 10 contains one or more internal passageway 40, the air is directed into each passageway. Air is then directed outwardly, away from the second device 10 in a direction which differs from its original pathway upon entry into the second device 10, through the air distribution members, which in this illustration is represented by the second plurality of openings 36. As the air is directed out from the second device 10, a pressurized airflow is formed and is represented by arrows 60. The airflow is directed in a parallel orientation relative to the windshield 46, thus creating a partial wall of air that prevents, or minimizes, bugs from contact as the motor vehicle is moving. The airflow represented by arrows 58 and arrows 60 generated from the first device 10 and the second device 10 create a wind curtain across the windshield 46, creating a horizontal air shield that prevents bugs from contacting and splattering the viewing surface 48.

Figure 11:
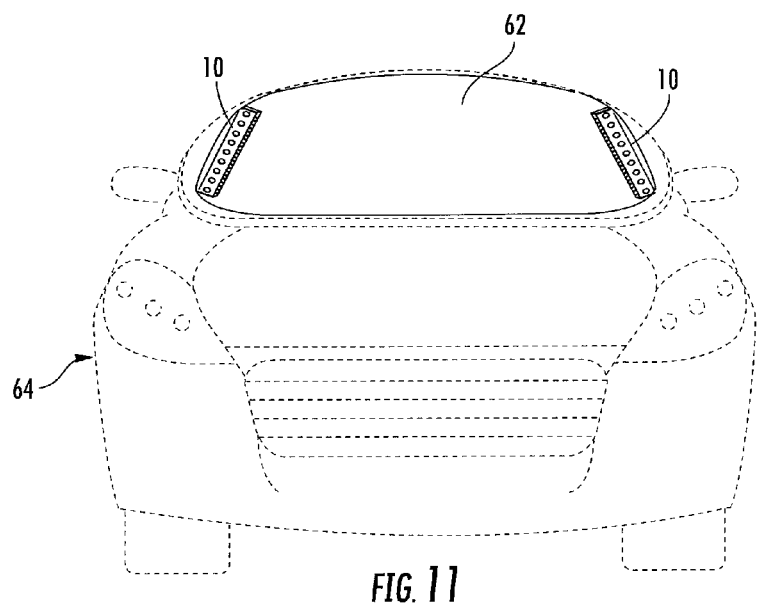
FIG. 11 is a front view of an illustrative representation of an automobile having the devices for providing a wind curtain installed on the front windshield.
Figure 12:
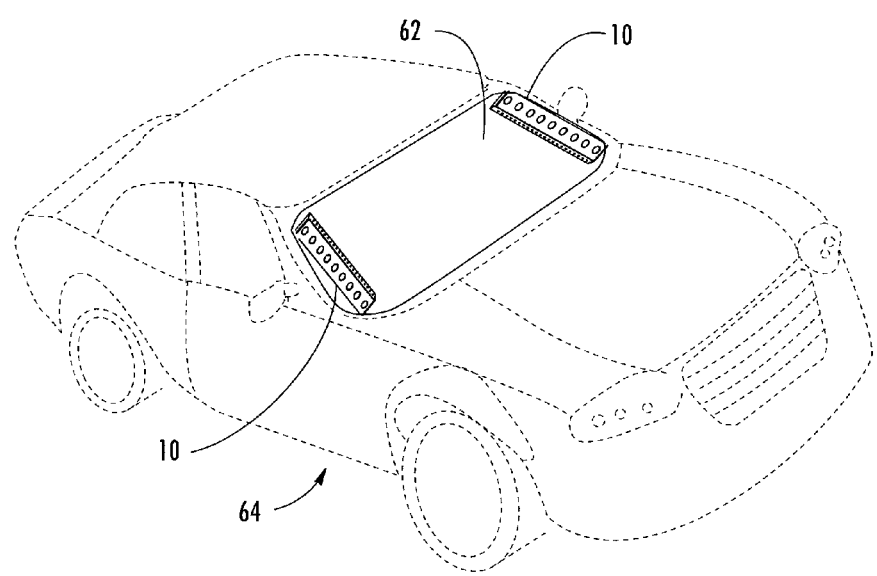
FIG. 12 is a perspective view representation of an automobile having a plurality of devices for providing a wind curtain installed on the front windshield.
Figure 13:
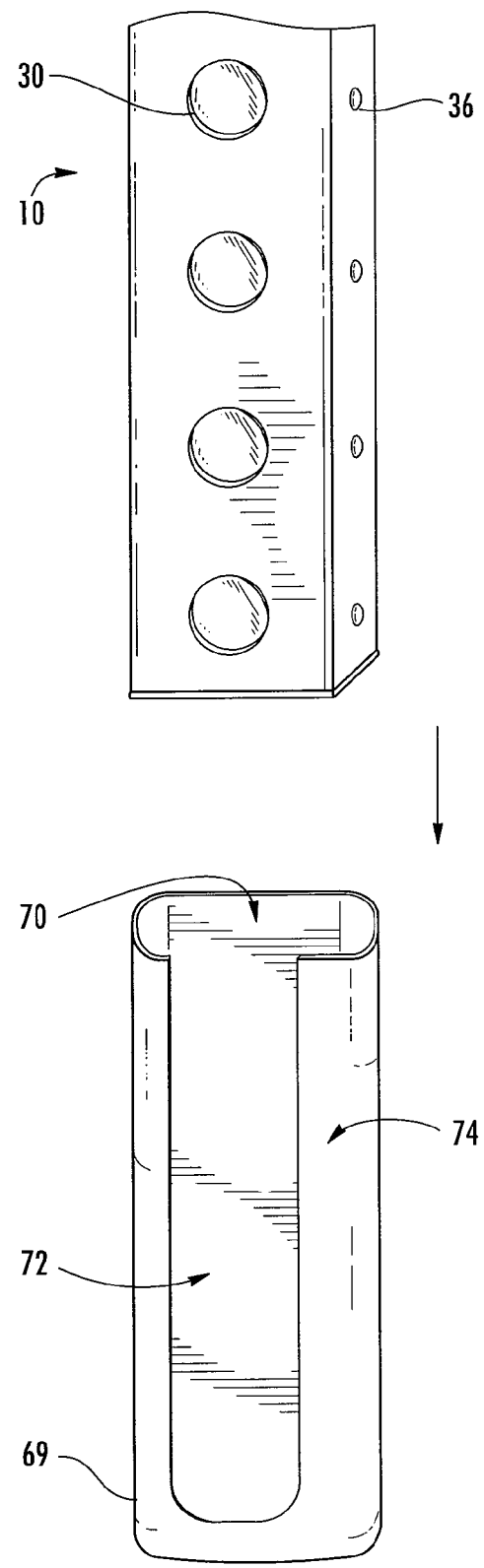
FIG. 13 illustrates a bracket system for use in removably securing the device for providing a wind curtain onto a viewing surface.

FIGS. 11 and 12 provide an illustrative view of the devices 10 attached to the windshield 62 of an automobile 64. In one embodiment, the device 10 can be attached to a portion of the windshield 62 via a chemical adhesive solution, see FIG. 4B, such as a pressure sensitive adhesive. The pressure sensitive adhesive may include an acrylate polymer, rubber or silicones. As such, the side wall 20 may contain an adhesive material 66 on one or more portions of the side wall. A release liner 68, such as fluorosilicones or vinyl carbamates, may be placed over the adhesion material 66 to prevent premature sticking. A primer layer (not shown) placed between the adhesive material 66 and the release liner 68 may be used to maintain the integrity of the adhesive by limiting diffusion between the two layers. Upon installation, the user can simply remove the release liner 68 and stick the device 10, with the side wall 20 placed against the viewing surface. Alternatively, the device 10 may be secured to a bracket 69, see FIG. 13 which is affixable onto a windshield. The bracket 69 has an internal compartment sized and shaped to receive and fix the device 10 in place. An open front side, see arrow 72, and an open side portion, see arrow 74, allow airflow to enter and exit the device. In this manner, the bracket 69 remains fixed to the vehicle, but the device 10 can be slidably removed when needed.

The ability of the device 10 to reduce or prevent bugs from contacting a viewing surface associated with a moving vehicle was tested. A single device 10 was placed on one side on one side of a windshield of an automobile. The second, opposing side of the windshield did not contain a device 10. The automobile was driven in South Florida in areas associated with bugs and known to cause problems for drivers, such as bug strikes or splattering on the windshield. When the two sides were compared, the side of the windshield having the device 10 secured to thereto contained many less bug strikes or windshield splattering than was visualized on the side of the windshield that did not contain the device 10.

While the present invention has been described using an automobile, the device 10 can be applied to any viewing surface associated with a moving vehicle.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A device for providing a wind barrier upon a viewing surface associated with a moving vehicle comprising a main body comprising a solid interior region having a plurality of individual passageways, said solid interior region enclosed by at least a first surface, a second surface, and a third surface;
    said first surface configured to be securable to a viewing surface associated with a moving vehicle;
    said second surface comprising a plurality of individual air intake openings spaced apart and arranged along the length of said second surface, each of said plurality of individual air intake openings configured to receive airflow generated by movement of said moving vehicle, whereby said received airflow is directed into said interior region;
    said third surface comprising a plurality of individual air distribution openings spaced apart and arranged along the length of said third surface, each individual air distribution opening connected to one individual air intake opening by one of said plurality of individual passageways;
    each of said plurality of individual passageways configured to receive and direct air flow therethrough, whereby airflow directed into one of said plurality of air passages through said air intake opening is diverted out of said internal passageway through a corresponding air distribution opening of said third surface in a direction that is different than the direction of air flow entering said plurality of air intake openings within said second surface.

2. The device for providing a wind barrier upon a viewing surface associated with a moving vehicle according to claim 1 wherein said third surface is arranged in a substantially perpendicular orientation with respect to a viewing surface associated with a moving vehicle.

3. The device for providing a wind barrier upon a viewing surface associated with a moving vehicle according to claim 2 wherein said second surface is arranged at a different orientation with respect to said third surface.

4. The device for providing a wind barrier upon a viewing surface associated with a moving vehicle according to claim 3 wherein said second surface is arranged at a 90 degree angle with respect to said third surface.

5. The device for providing a wind barrier upon a viewing surface associated with a moving vehicle according to claim 3 wherein said second surface is arranged at an acute angle with respect to said third surface.

6. The device for providing a wind barrier upon a viewing surface associated with a moving vehicle according to Claim 1 wherein said plurality of individual air intake openings have larger diameters than diameters of said plurality of individual air distribution openings.

7. The device for providing a wind barrier upon a viewing surface associated with a moving vehicle according to claim 1 wherein said first surface contains an adhesive material.

8. A system for providing a wind barrier upon a viewing surface associated with a moving vehicle comprising:
   a first device secured at one end of a viewing surface associated with a moving vehicle, said first device comprising a first wall securable to said viewing surface associated with a moving vehicle; a second wall comprising a plurality of air intake members adapted to received airflow generated by motion associated with movement of said moving vehicle; and a third wall comprising a plurality of air distribution members, said first wall, said second wall, and said third wall enclosing a solid interior area, each air intake member of said plurality of air intake members connected to an individual air distribution member of said plurality of air distribution members through an individual internal passageway of a plurality of internal passageways positioned within said solid interior area, said third wall orientated at a different position relative to said second wall, each of said plurality of internal passageways configured to receive and divert said airflow generated by motion of said moving vehicle along a path that includes an airflow pattern parallel to said viewing surface associated with said moving vehicle; and
   a second device secured at a second end of said viewing surface associated with said moving vehicle, said second device comprising a second device first wall securable to said viewing surface associated with a moving vehicle; a second device second wall comprising a plurality of second device air intake members adapted to receive airflow generated by motion associated with movement of said moving vehicle; and a second device third wall comprising a plurality of second device air distribution members, said second device first wall, said second device second wall, and said second device third wall enclosing a second device solid interior area, each of said plurality of second device air intake members connected to an individual second device air distribution member of said plurality of second device air distribution members through an individual second device internal passageway of a plurality of second device internal passageways positioned within said second device solid interior area, said second device third wall orientated at a different position relative to said second device second wall, each said second device internal passageway configured to receive and divert said airflow generated by motion of said moving vehicle along a path that includes an airflow pattern parallel to said viewing surface associated with said moving vehicle;
   whereby airflow exiting said air distribution members of said first device is directed in a path that is parallel to and towards the center of said viewing surface associated with a moving vehicle and airflow exiting said air distribution members of said second device is directed in a path that is parallel to and towards the center of said viewing surface associated with a moving vehicle to form a wind barrier thereupon.

9. The system for providing a wind barrier upon a viewing surface associated with a moving vehicle according to claim 8 wherein said plurality of air intake members of said first device is a plurality of openings and said plurality of air intake members of said second device is a second plurality of openings.

10. The system for providing a wind barrier upon a viewing surface associated with a moving vehicle according to claim 9 wherein said air intake members of said first device and said second device have a larger diameter than said air distribution members of said first device and said second device.

11. The system for providing a wind barrier upon a viewing surface associated with a moving vehicle according to claim 8 wherein said first wall of said first device and said first wall of said second device each have an adhesive material.

12. The system for providing a wind barrier upon a viewing surface associated with a moving vehicle according to claim 8 wherein said viewing surface associated with a moving vehicle is a windshield.

* * * * *